US011466730B2

(12) United States Patent
Albizua Macua et al.

(10) Patent No.: US 11,466,730 B2
(45) Date of Patent: Oct. 11, 2022

(54) METHOD OF ASSEMBLING A DRIVE TRAIN HAVING IMPROVED STIFFNESS FOR AN ELECTRIC MACHINE

(71) Applicant: Siemens Gamesa Renewable Energy Innovation & Technology S.L., Sarriguren (ES)

(72) Inventors: Juan Albizua Macua, Pamplona (ES); Hugo De Carlos Alegre, Pamplona (ES); Mickaël Durand, Gorraiz (ES); Pedro Irigoyen Escorza, Burlada (ES); Roberto Repiso Barrera, Donostia (ES)

(73) Assignee: SIEMENS GAMESA RENEWABLE ENERGY INNOVATION & TECHNOLOGY S.L.

( * ) Notice: Subject to any disclaimer, the term of this patent is extended or adjusted under 35 U.S.C. 154(b) by 0 days.

(21) Appl. No.: 16/950,966

(22) Filed: Nov. 18, 2020

(65) Prior Publication Data

US 2021/0164517 A1    Jun. 3, 2021

(30) Foreign Application Priority Data

Nov. 29, 2019  (ES) .................................. P201900178
Mar. 10, 2020  (EP) ..................................... 20162139

(51) Int. Cl.
*F03D 80/70*  (2016.01)
*F16C 25/08*  (2006.01)
(Continued)

(52) U.S. Cl.
CPC ............ *F16C 25/083* (2013.01); *F03D 13/10* (2016.05); *F03D 80/70* (2016.05); *F16C 19/38* (2013.01);
(Continued)

(58) Field of Classification Search
CPC ........ F03D 80/70; F16C 25/083; F16C 19/54; F16C 19/546
See application file for complete search history.

(56) References Cited

U.S. PATENT DOCUMENTS 9,284,949 B2 *    3/2016  Pick ......................... F16C 41/02
2018/0051678 A1 *  2/2018  Fierro .................... F16C 19/385
2019/0257294 A1 *  8/2019  Abreu ................... F03D 1/0691

FOREIGN PATENT DOCUMENTS

CN         201225228 Y    4/2009
EP         2754893 A1     7/2014
(Continued)

OTHER PUBLICATIONS

European Search Report dated Sep. 7, 2020 for Application No. 20162139.8.

*Primary Examiner* — Justin D Seabe
(74) *Attorney, Agent, or Firm* — Schmeiser, Olsen & Watts LLP (57) ABSTRACT

A drive train for an electric machine is provided. The drive train includes a shaft. The shaft has a front end and a rear end and which is supported in a housing via a front bearing and a rear bearing, wherein the front bearing including a front bearing outer ring and a front bearing inner ring, and the rear bearing including a rear bearing outer ring and a rear bearing inner ring). The drive train includes a first cover mounted to the housing and being configured to seal a rear side of the front bearing, wherein the first cover is mounted to the housing by an auxiliary support which connects the first cover to the housing, a second cover mounted to the housing and being configured to seal a front side of the rear bearing, a third cover mounted to the housing and being configured to seal the rear bearing.

19 Claims, 11 Drawing Sheets

(51) Int. Cl.
    *F03D 13/10* (2016.01)
    *F16C 19/38* (2006.01)
(52) U.S. Cl.
    CPC ..... *F05B 2220/705* (2020.08); *F05B 2230/60* (2013.01); *F05B 2240/50* (2013.01); *F05B 2240/60* (2013.01)

(56) References Cited

FOREIGN PATENT DOCUMENTS

| | | |
|---|---|---|
| EP | 3279471 A1 | 2/2018 |
| KR | 20110139957 A | 12/2011 |
| WO | WO 2018153417 A1 | 8/2018 |

\* cited by examiner

METHOD OF ASSEMBLING A DRIVE TRAIN HAVING IMPROVED STIFFNESS FOR AN ELECTRIC MACHINE

CROSS-REFERENCE TO RELATED APPLICATIONS

This application claims priority to European Application No. 20162139.8, having a filing date of Mar. 10, 2020 and ES Application No. P201900178, having a filing date of Nov. 29, 2019, the entire contents both of which are hereby incorporated by reference.

FIELD OF TECHNOLOGY

The following relates to a method of assembling a drive train for an electric machine, and to such a drive train having improved stiffness. The electric machine can be a generator of a wind turbine.

BACKGROUND

Figure 14:
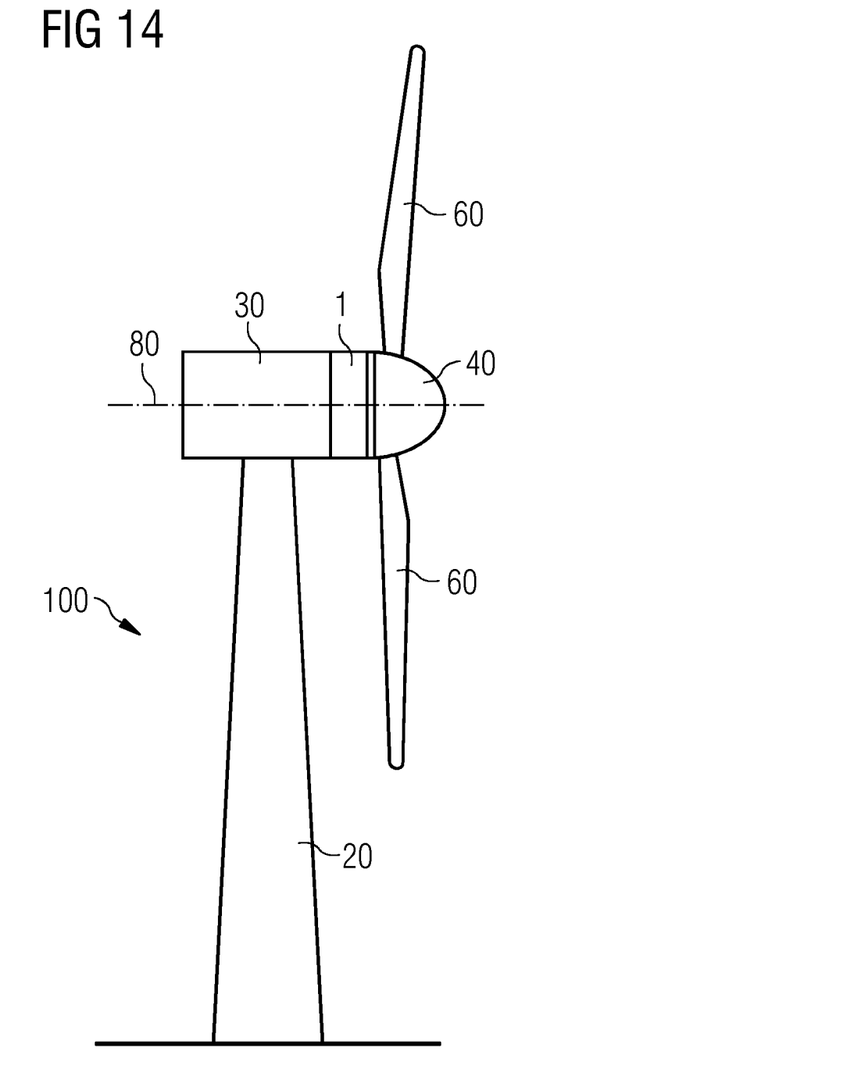
FIG. 14 shows a configuration of a wind turbine and the different elements thereof.

FIG. 14 shows an example of a conventional configuration of a wind turbine 100. The wind turbine 100 comprises a nacelle 30 and a tower 20. The nacelle 30 is mounted to the top of the tower 20. The nacelle 30 is mounted rotatable with regard to the tower 20 by a yaw bearing. The axis of rotation of the nacelle 30 with regard to the tower 20 is referred to as the yaw axis.

The wind turbine 100 also comprises a hub 40 with three rotor blades 60 (of which two rotor blades 60 are depicted in FIG. 14). The hub 40 is mounted rotatable with regard to the nacelle 30 by main bearings, i.e. front and rear bearings which are described later. The hub 40 is mounted rotatable about a rotor axis of rotation 80.

The wind turbine 100 furthermore comprises a generator 18. The generator 18 in turn comprises a rotor connecting the generator 18 with the hub 40. The hub 40 is connected directly to the generator 18, thus the wind turbine 100 is referred to as a gearless, direct-driven wind turbine. Such a generator 18 is referred as direct drive generator 18. As an alternative, the hub 40 may also be connected to the generator 18 via a gear box. This type of wind turbine 100 is referred to as a geared wind turbine. Embodiments of the present invention are suitable for both types of wind turbines 100.

The generator 18 is accommodated within the nacelle 30. The generator 18 is arranged and prepared for converting the rotational energy from the hub 40 into electrical energy in the shape of an AC power.

Figure 15:
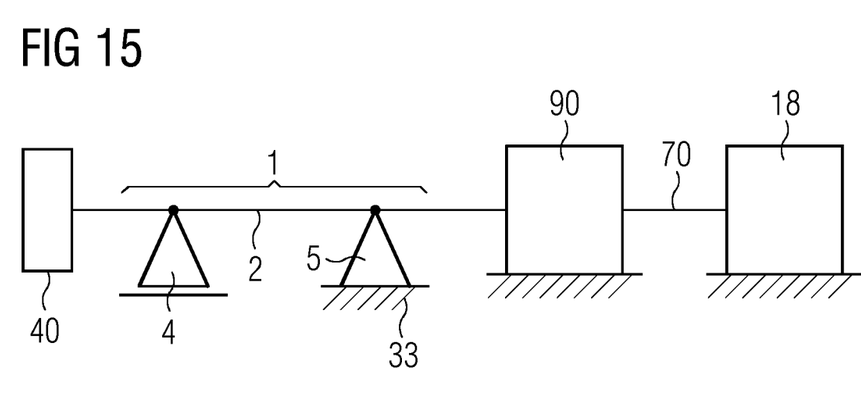
FIG. 15 shows a configuration including a drive train and the generator.

The generator 18 comprises a stator having at least one coil winding, and the rotor having at least one permanent magnet and being rotatably relatively to the stator about a rotor axis by a rotor shaft 70 (FIG. 15).

FIG. 15 shows a configuration including the generator 18 and a drive train 1 which connects the generator 18 to the hub 40. The front end of a rotor shaft 70 of the generator 18 is connected to a gearbox and a brake (both designated by reference sign 90, although they can be separate entities). An output shaft 2 of the gearbox 90, which is simply referred to as a shaft 2, has a front end and a rear end. At the front end of the shaft 2, the hub 40 is connected. The shaft 2 is supported in a housing via a front bearing 4 and the rear bearing 5. Reference sign 33 designates a bedplate by which the drive train is supported. The bedplate 33 can be a part of the housing or can be connected thereto. The front and rear bearings 4, 5 are sealed by bearing covers so that grease in the front and rear bearings is prevented from leaking. At the same time, the bearing covers protect the front and rear bearings against dust.

Conventionally, the housing comprises multiple parts which are assembled one after the other in accordance to an assembly order of the bearings and bearing covers.

Efforts have been made by using a single-piece housing to obtain an improved stiffness and/or a reduced weight. However, when a single-piece housing is used, tapered roller bearings (TRB) must be used to enable the assembly. That is, contrary to spherical roller bearings (SRB), the inner and outer rings of TRB bearings can be separated, which enables the assembly of the drive train for a generator. However, TRB bearings are more expensive compared with SRB bearings.

SUMMARY

An aspect relates to a drive train for an electric machine, which has an increased stiffness under low costs.

According to a first aspect of embodiments of the invention, a method of assembling a drive train for an electric machine, for a generator of a wind turbine, is provided. The drive train comprises a shaft having a front end and a rear end. The shaft is supported in a housing via a front bearing and a rear bearing. The front bearing comprises a front bearing outer ring and a front bearing inner ring, and the rear bearing comprising a rear bearing outer ring and a rear bearing inner ring. The method comprising the following steps: a) providing the shaft; b) mounting the front bearing to the shaft by temporarily heating the front bearing and shifting the same to a front position at the shaft; c) arranging a first cover and a second cover at the shaft from a rear end of the shaft, the first cover is configured to seal a rear side of the front bearing and the second cover is configured to seal a front side of the rear bearing; d) mounting the rear bearing to the shaft by temporarily heating the rear bearing and shifting the same from the rear end of the shaft to a rear position at the shaft; e) mounting the second cover to the rear bearing outer ring; f) mounting the housing to the shaft by temporarily heating the housing and relatively moving the same over the shaft from the rear end of the shaft till a housing abutment abuts to the second cover; g) mounting the second cover to the housing; h) dismounting the second cover from the rear bearing outer ring; and i) mounting a third cover to the housing such that the rear bearing outer ring is secured or compressed by the second and third covers. The third cover is configured to seal a rear side of the rear bearing.

In an embodiment, the method further comprises connecting the first cover to the housing such that a first axial clearance remains between the first cover and the front bearing, by mounting an auxiliary support to the housing which connects the first cover to the housing. In an embodiment, the auxiliary support is mounted through an access window in the housing between the first and second covers.

In an embodiment, the method further comprises at least one of the following features: in step e), the second cover is mounted to the rear bearing outer ring by bolts, and in step h), the second cover is dismounted from the rear bearing outer ring by releasing the bolts; in step g), the second cover is mounted to the housing by bolts; in step i), the third cover is mounted to the housing by bolts; and the auxiliary support is mounted to the housing and the first cover by bolts.

In an embodiment, the method further comprises, after step i), mounting a ring to the shaft such that the ring secures and/or contacts the rear bearing inner ring.

In an embodiment, the method further comprises, before step b), mounting a fourth cover to the housing, the fourth cover is configured to seal a front side of the front bearing, and in step b), the front bearing is shifted to the front position at the shaft from a rear end of the shaft such that a second axial clearance remains between the fourth cover and the front bearing.

In an embodiment, at least one of the front bearing and the rear bearing comprises non-tapered rolling bodies, and spherical rolling bodies.

In an embodiment, the housing is a single-piece housing.

In an embodiment, the method further comprises, between steps g) and h), a step of temporarily supporting the housing by a jig.

According to a second aspect of embodiments of the invention, a drive train for an electric machine for a generator of a wind turbine, is provided. The drive train comprises a shaft having a front end and a rear end and which is supported in a housing via a front bearing and a rear bearing, wherein the front bearing comprising a front bearing outer ring and a front bearing inner ring, and the rear bearing comprising a rear bearing outer ring and a rear bearing inner ring; a first cover mounted to the housing and being configured to seal a rear side of the front bearing, wherein the first cover is mounted to the housing by an auxiliary support which connects the first cover to the housing; and a second cover mounted to the housing and being configured to seal a front side of the rear bearing; a third cover mounted to the housing and being configured to seal a rear side of the rear bearing, where-in the rear bearing outer ring is secured or compressed by the second and third covers. The housing is a single-piece housing, and the housing comprises an access window between the first and second covers.

In an embodiment, the first cover is connected to the housing such that a first axial clearance remains between the first cover and the front bearing.

In an embodiment, the drive train further comprises at least one of the following features: the second cover is mounted to the housing by bolts; the third cover is mounted to the housing by bolts; the auxiliary support is mounted to the housing and the first cover by bolts.

In an embodiment, the drive train further comprises a ring mounted to the shaft such that the ring secures and/or contacts the rear bearing inner ring.

In an embodiment, the drive train further comprises a fourth cover mounted to the housing and being configured to seal a front side of the front bearing, wherein a second axial clearance remains between the fourth cover and the front bearing.

In an embodiment, at least one of the front bearing and the rear bearing comprises non-tapered rolling bodies namely spherical rolling bodies.

According to embodiments of the present invention, the stiffness of the drive train assembly can be increased compared with a conventional design of two-part or multiple part bearing housings. A bolted joint connection between housing the and a main frame can also be improved.

According to embodiments of the present invention, a conventional or current design of the front and rear main bearings can be maintained in the shape of spherical roller bearings (SRB). Also the conventional or current design of the covers (sealings) can be maintained. In addition, the conventional or current tools for the assembly can be maintained. The access window enables access for maintainability of the drive train during the entire life span of the drive train.

A load transmission capacity from the rotor shaft to the machine frame for four-point suspended machines can be increased. The weight of the main frame can be reduced, and the number of bolts in the housing/main frame interface can also be reduced.

It has to be noted that embodiments of the invention have been described with reference to different subject matters. Some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters and between features of the apparatus type claims and features of the method type claims is considered as to be disclosed with this application.

BRIEF DESCRIPTION

Some of the embodiments will be described in detail, with references to the following Figures, wherein like designations denote like members, wherein.

DETAILED DESCRIPTION

Figure 1:
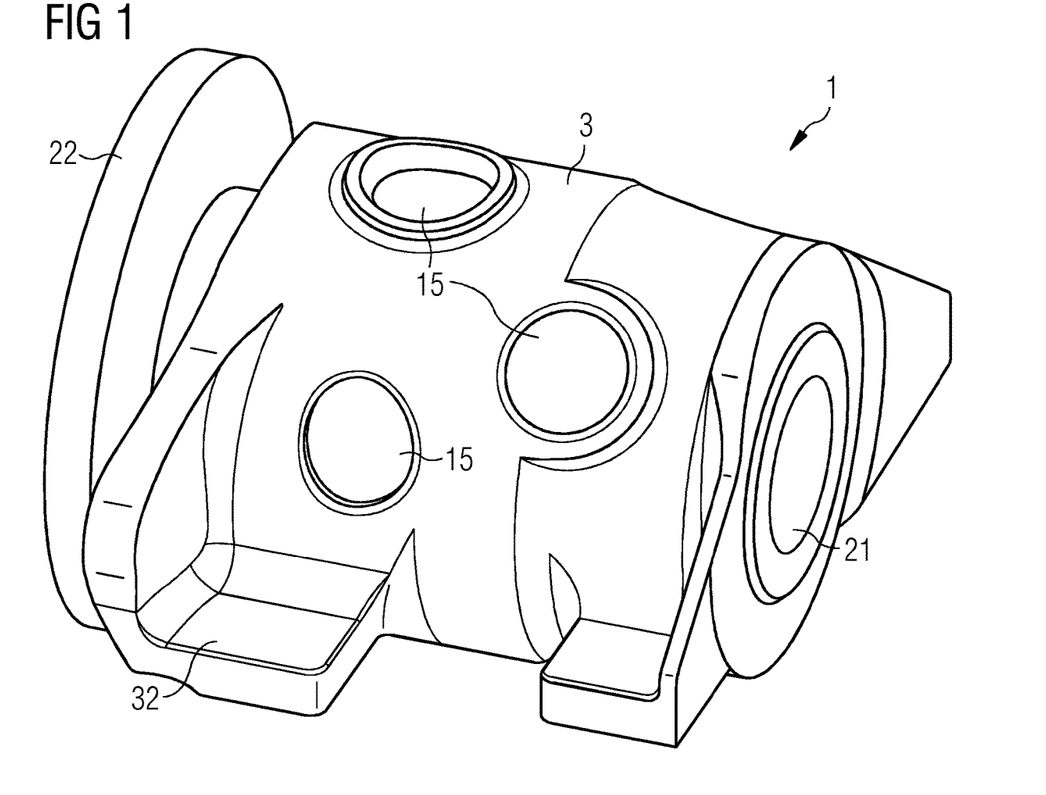
FIG. 1 shows a perspective view of a part of a drive train for a generator according to an embodiment.
Figure 2:
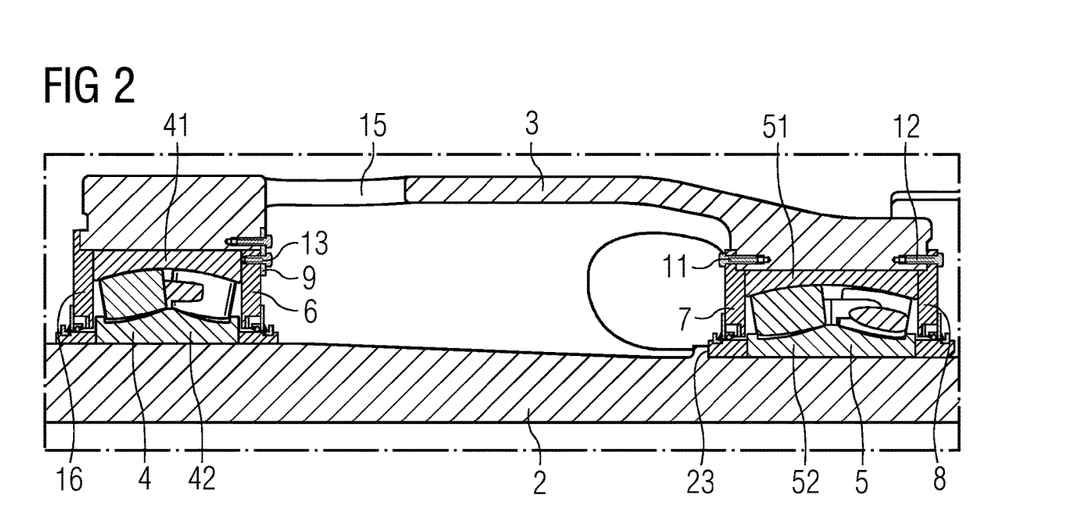
FIG. 2 shows a cross-sectional view of a part of the drive train according to an embodiment.
Figure 3:
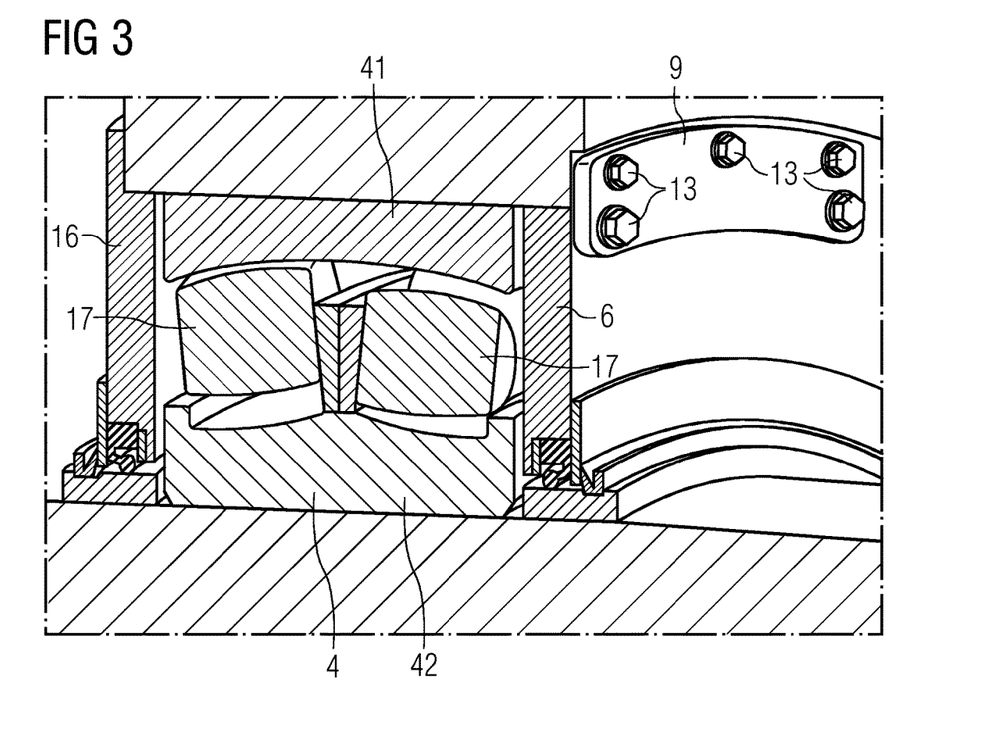
FIG. 3 shows a perspective cross-sectional view of a front bearing of the drive train according to the embodiment.
Figure 4:
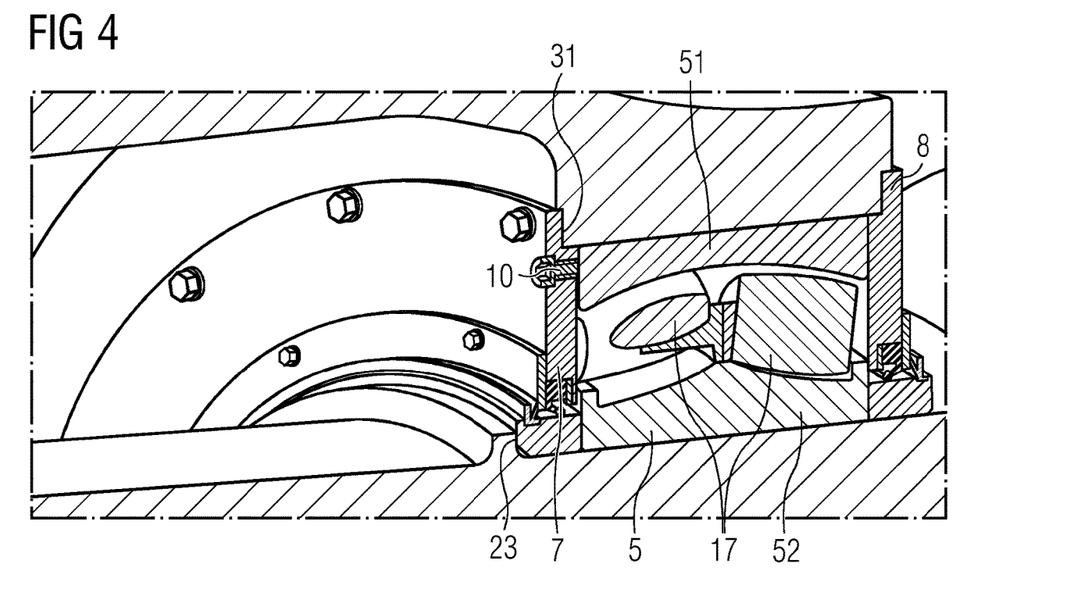
FIG. 4 shows a perspective cross-sectional view of a rear bearing of the drive train according to the embodiment.

FIG. 1 shows a perspective view of a part of a drive train 1 according to an embodiment; FIG. 2 shows a cross-sectional view of a part of a drive train 1 according to the embodiment; FIG. 3 shows a perspective cross-sectional view of a front bearing 4 of the drive train 1 according to the embodiment; and FIG. 4 shows a perspective cross-sectional view of a rear bearing 5 of the drive train 1 according to the embodiment. The drive train 1 is intended to be used for a generator 18 of a wind turbine.

The drive train 1 comprises a shaft 2. The shaft 2 comprises a flange 22, to which a hub 40 (FIG. 15) can be mounted by bolts. The shaft 2 further comprises a hollow shaft portion 21 which has a front end and a rear end and is supported in a housing 3 via a front bearing 4 and a rear bearing 5. The hollow shaft portion 21 can be either connected directly to the generator 18 or to the gearbox 90 (FIG. 15). The housing 3 comprises a number of retainer portions 32 by which the housing 3 can be fixed to a (main) frame such as the bedplate 33.

The front bearing 4 comprises a front bearing outer ring 41 and a front bearing inner ring 42, and the rear bearing 5 comprises a rear bearing outer ring 51 and a rear bearing inner ring 52.

A first cover 6 is mounted to the housing 3 and configured to seal a rear side of the front bearing 4. The first cover 6 is mounted to the housing 3 by an auxiliary support 9 which connects the first cover 6 to the housing 3. The auxiliary support 9 is mounted to the housing 3 and the first cover 6 by bolts 13. The first cover 6 is mounted to the housing 3 such that a first axial clearance remains between the first cover 6 and the front bearing 4.

A second cover 7 is mounted to the housing 3 and configured to seal a front side of the rear bearing 5, wherein the second cover 7 is mounted to the housing 3 by bolts 11. A third cover 8 is mounted to the housing 3 and configured to seal a rear side of the rear bearing 5. The third cover 8 is mounted to the housing 3 by bolts 12. The rear bearing outer ring 51 is secured, i.e. compressed, between the second and third covers 7, 8 so that the rear bearing 5 functions as a fixed bearing.

A fourth cover 16 mounted to the housing 3 and configured to seal a front side of the front bearing 4, wherein a second axial clearance remains between the fourth cover 16 and the front bearing 4 so that the front bearing 4 functions as a floating bearing. Each of the first to fourth covers 6, 7, 8, 16 comprise a shaft seal at the inner circumference thereof. Thereby, the front and rear bearings 4, 5 are sealed by the first to fourth covers 6, 7, 8, 16 so that grease in the front and rear bearings 4, 5 is prevented from leaking. At the same time, the first to fourth covers 6, 7, 8, 16 protect the front and rear bearings 4, 5 against dust and dirt.

The housing 3 is a single-piece housing and comprises at least one access window 15 between the first and second covers 6, 7. The access window 15 is used for assembling and maintaining the drive train 1. The access window 15 enables an access for maintainability of the drive train 1 during the entire life span of the drive train 1, and it is not necessary to close the access window 15 during operation as the front and rear bearings 4, 5 are well covered by the first to fourth covers 6, 7, 8, 16. The housing 3 can comprise at least two access windows 15 which are configured for an access of a left arm and a right arm of a user.

The drive train 1 further comprises a ring 14 (FIG. 13) mounted to the shaft 2 such that the ring 14 secures the rear bearing inner ring 52. The ring 14 can contact the rear bearing inner ring 52.

As can be taken from FIGS. 3 and 4, the front and rear bearings 4, 5 comprise non-tapered rolling bodies 17 and spherical rolling bodies. Since the drive train 1 according to embodiments of the present invention has the access window 15 and the auxiliary support 9, it is possible to use the spherical rolling bodies 17 (SRB) instead of tapered rolling bodies (TRB), although the housing 3 is a single-piece housing. The SRB are less expensive than TRB.

Figure 5:
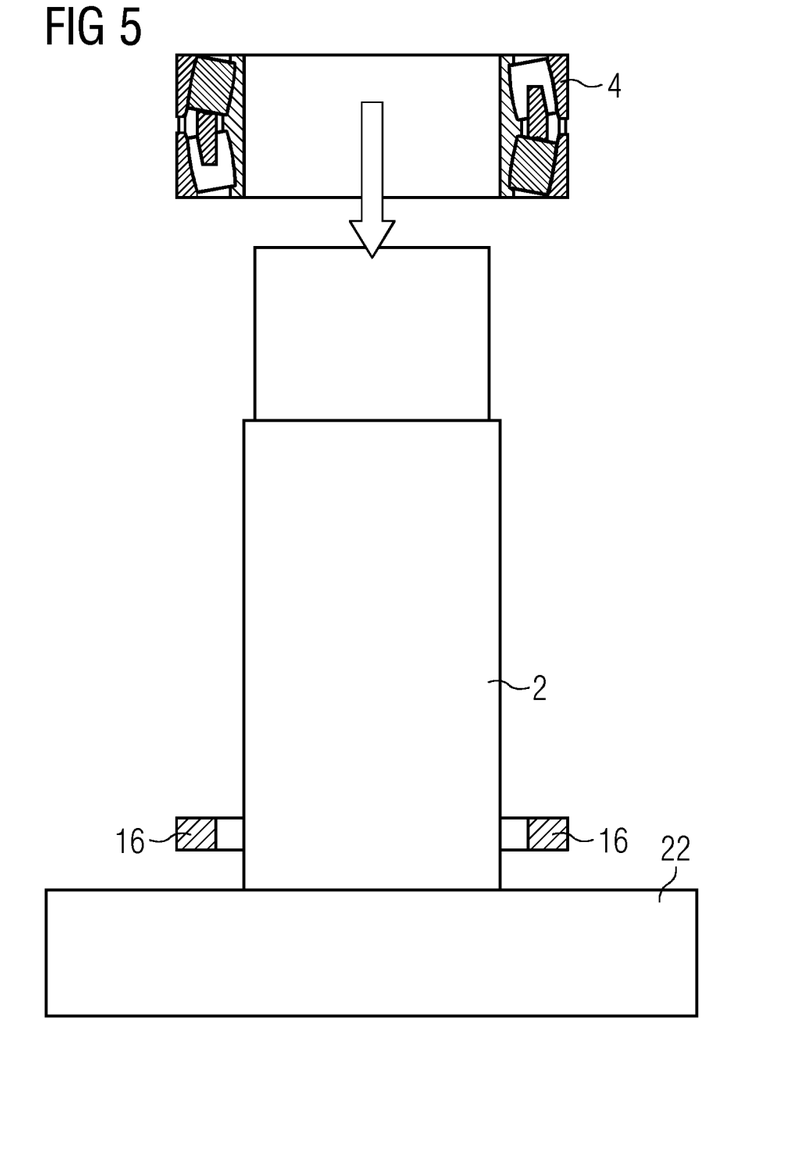
FIG. 5 shows a schematic cross-sectional view of the drive train during a method of manufacturing the same according to an embodiment.

FIG. 5 shows a schematic cross-sectional view of the drive train 1 during the method of manufacturing the same according to an embodiment. In a first step, the shaft 2 is provided. A fourth cover 16 is mounted to the housing 3, wherein the fourth cover 16 is configured to seal a front side of a front bearing 4. Then, from a rear end of the shaft 2, the front bearing 4 is mounted to the shaft 2 by temporarily heating the front bearing 4 and shifting the same to a front position at the shaft 2. The front bearing 4 can be heated up to 150° C. (maximum), wherein a heat difference $\Delta t$ between the front bearing outer ring 41 and the front bearing inner ring 42 can be smaller than 25° C.

The front bearing 4 is shifted to the front position at the shaft 2 from a rear end of the shaft 2 such that a second axial clearance can remain between the fourth cover 16 and the front bearing 4.

Figure 6:
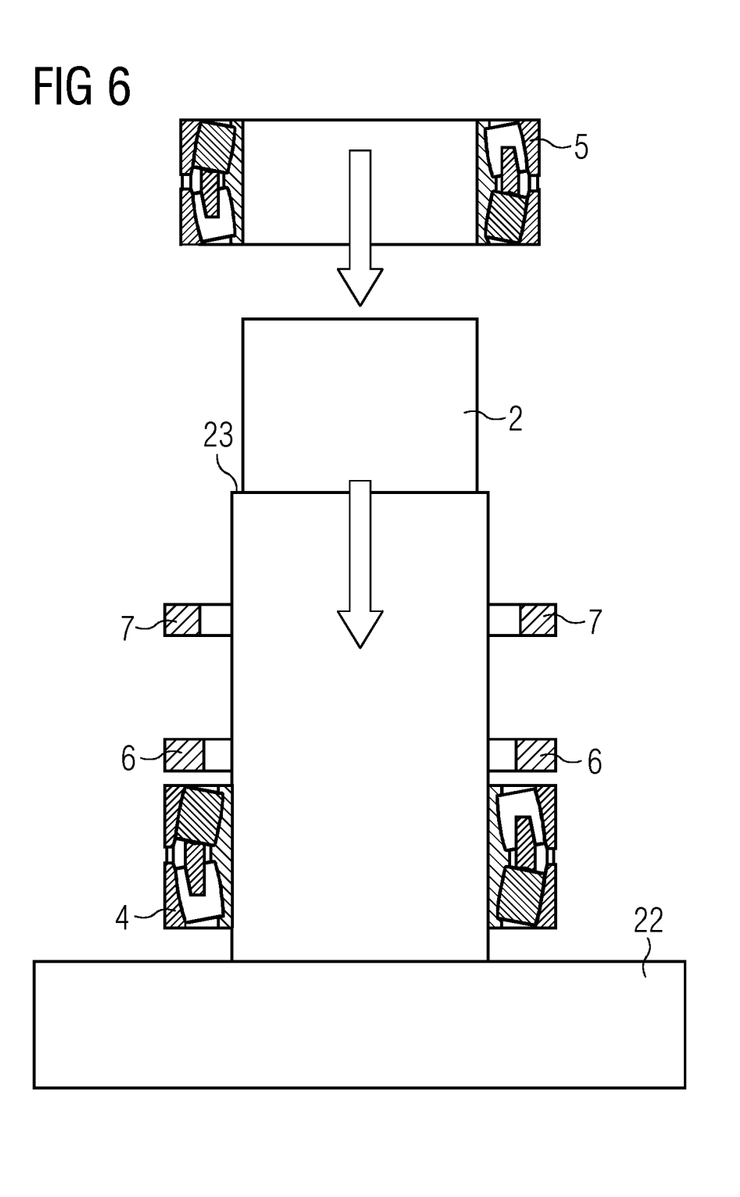
FIG. 6 shows a schematic cross-sectional view of the drive train during the method of manufacturing the same according to an embodiment.
Figure 7:
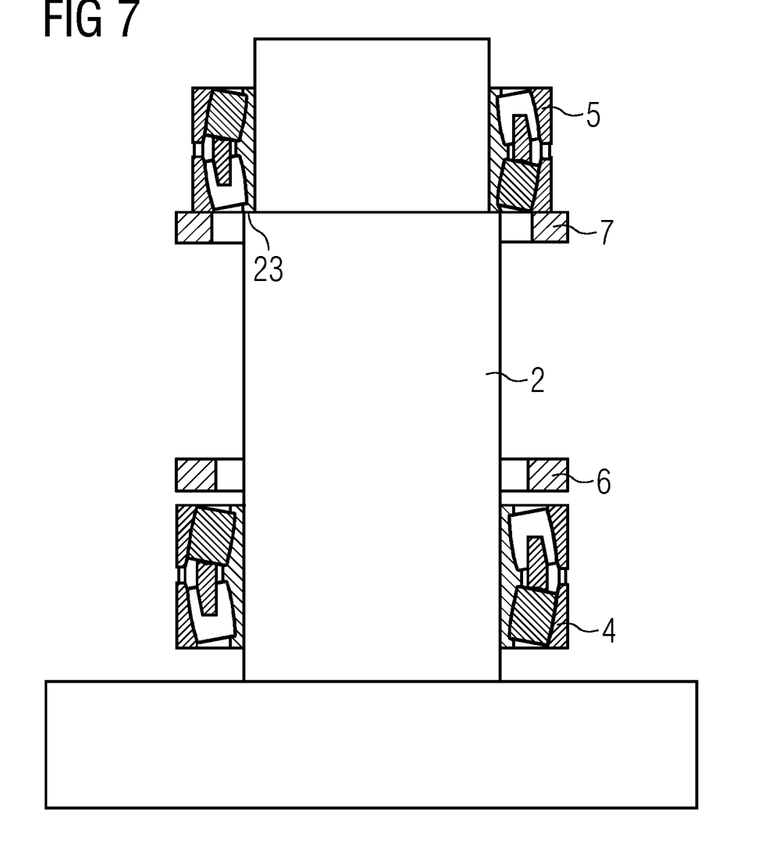
FIG. 7 shows a schematic cross-sectional view of the drive train during the method of manufacturing the same according to an embodiment.

FIG. 6 shows a schematic cross-sectional view of the drive train 1 during the method of manufacturing the same according to an embodiment; and FIG. 7 shows a schematic cross-sectional view of the drive train 1 during the method of manufacturing the same according to an embodiment. A first cover 6 and a second cover 7 are arranged at the shaft 2 from the rear end of the shaft 2, wherein the first cover 6 is configured to seal a rear side of the front bearing 4 and the second cover 7 is configured to seal a front side of the rear bearing 5. The rear bearing 5 is mounted to the shaft 2 by temporarily heating the rear bearing 5 and shifting the same from the rear end of the shaft 2 to a rear position at the shaft 2. The rear bearing 5 can be heated up to 150° C. (maximum), wherein a heat difference $\Delta t$ between the rear bearing outer ring 51 and the rear bearing inner ring 52 can be smaller than 30° C. The final position of the rear bearing 5 is reached when the rear bearing 5 abuts to a shoulder 23 which is provided at the shaft 2.

Figure 8:
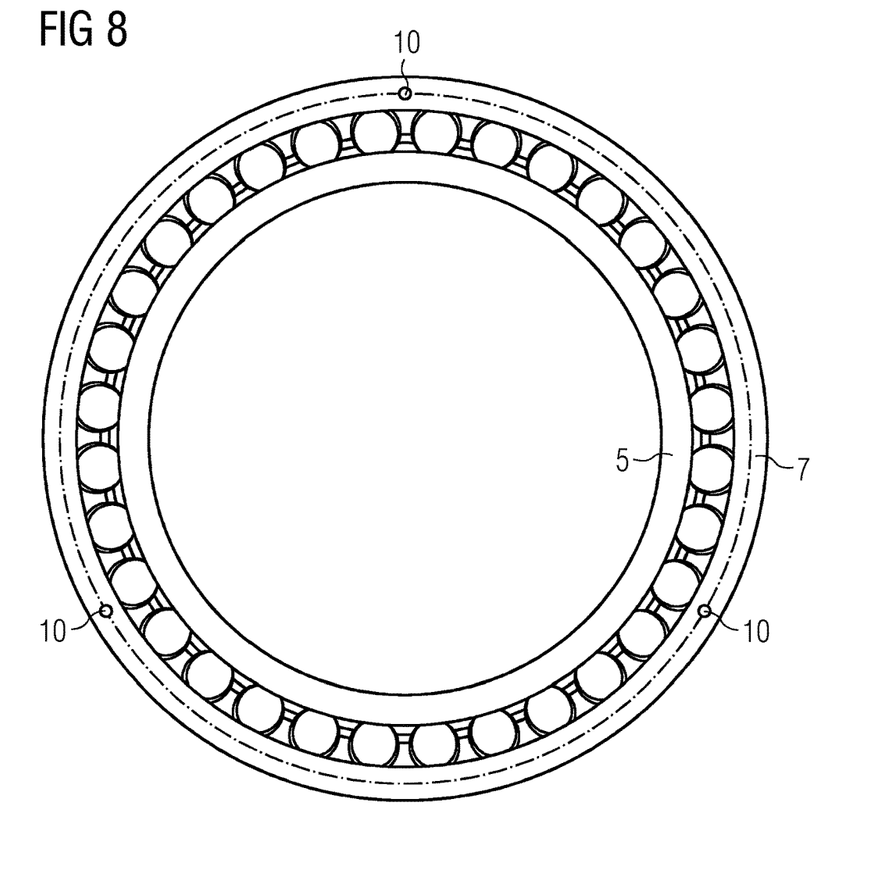
FIG. 8 shows a front view of a rear bearing outer ring.
Figure 9:
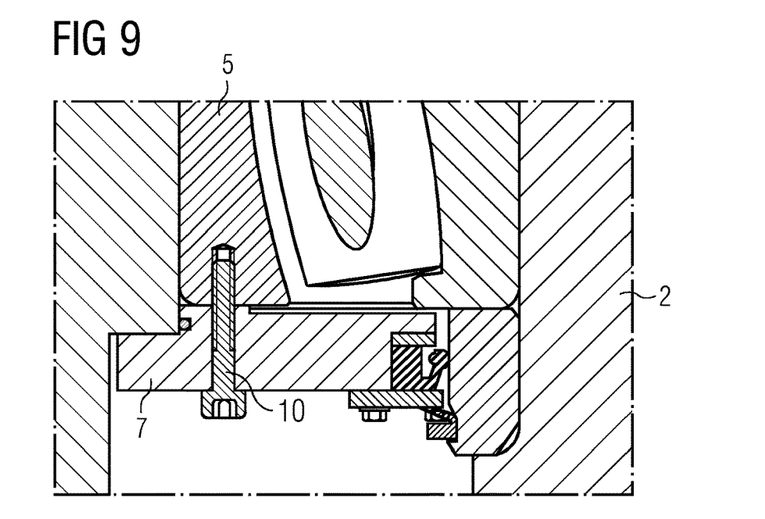
FIG. 9 shows a schematic cross-sectional view of the rear bearing and the second cover according to an embodiment.

FIG. 8 shows a front view of the rear bearing outer ring 51; and FIG. 9 shows a schematic cross-sectional view of the rear bearing 5 and the second cover 7 according to an embodiment. Here, the second cover 7 is mounted to the rear bearing outer ring 51 by bolts 10. Three bolts 10 can be used, for example three M16 bolts. The rear bearing outer ring 51 comprises three threaded holes for receiving the three bolts 10.

Figure 10:
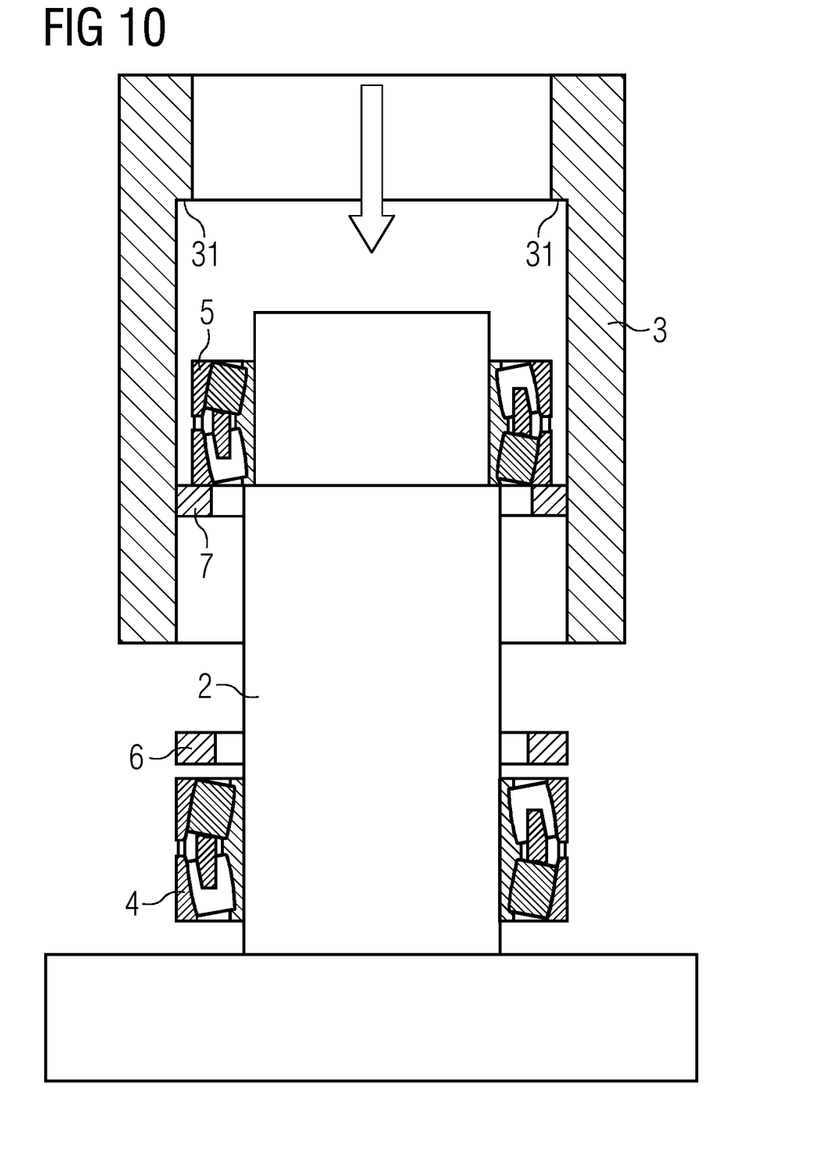
FIG. 10 shows a schematic cross-sectional view of the drive train during the method of manufacturing the same according to an embodiment.

FIG. 10 shows a schematic cross-sectional view of the drive train 1 during the method of manufacturing the same according to an embodiment. The housing 3 is mounted to the shaft 2 by temporarily heating the housing 3 and relatively moving the same over the shaft 2 from the rear end of the shaft 2 till a housing abutment 31 abuts to the second cover 7. The housing abutment 31 can have the shape of a shoulder. The housing 3 can be heated up to 110° C. (maximum), wherein a temperature difference $\Delta t$ between the housing 3 and bearings 4, 5 can be larger than 40° C. The shaft 2 is vertically orientated in the method step of FIG. 10 and also in the other method steps.

Figure 11:
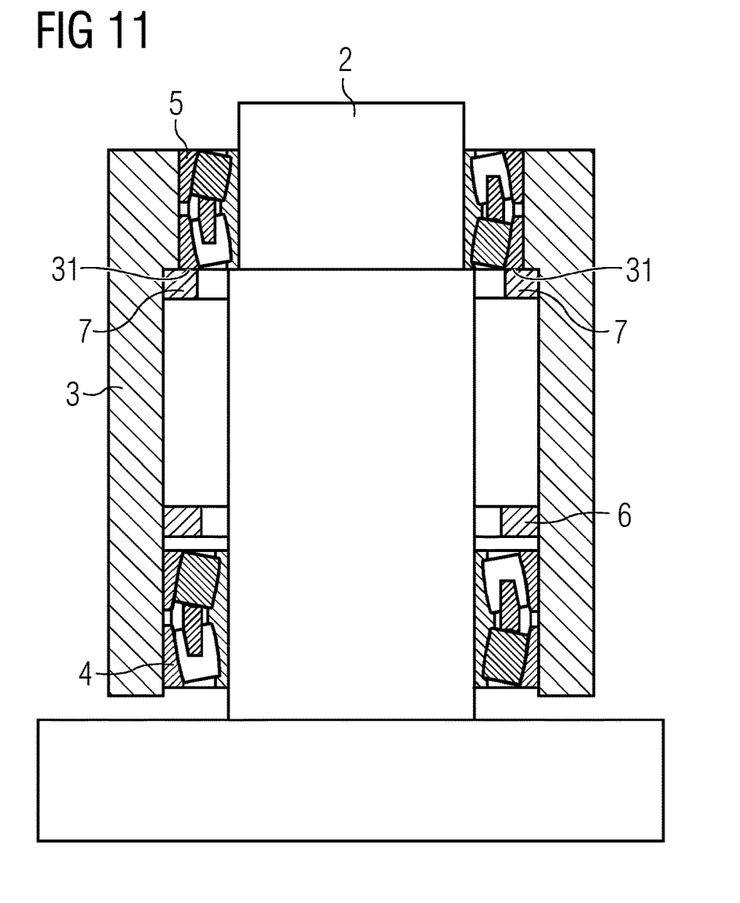
FIG. 11 shows a schematic cross-sectional view of the drive train during the method of manufacturing the same according to an embodiment.

FIG. 11 shows a schematic cross-sectional view of the drive train 1 during the method of manufacturing the same according to an embodiment. The second cover 7 is mounted to the housing 3 by bolts 11 (see FIG. 2). For this purpose, the user gets access through the access window 15. Optionally, the housing 3 can temporarily be supported by a jig (not shown) so that the weight of the housing 3 axially acting on the rear bearing outer ring 51 is reduced.

Figure 12:
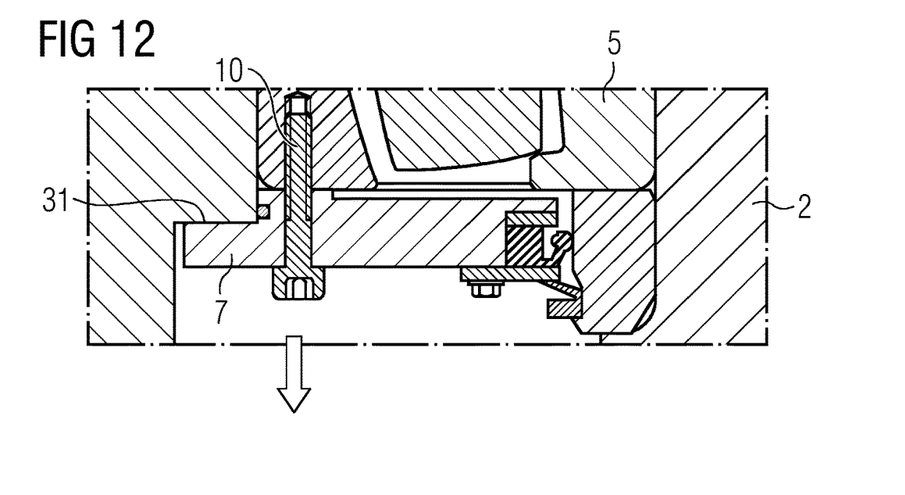
FIG. 12 shows a schematic cross-sectional view of the rear bearing and the second cover according to an embodiment.

FIG. 12 shows a schematic cross-sectional view of the rear bearing 5 and the second cover 7 according to an embodiment. The second cover 7 is dismounted from the rear bearing outer ring 51 by releasing the bolts 10.

Figure 13:
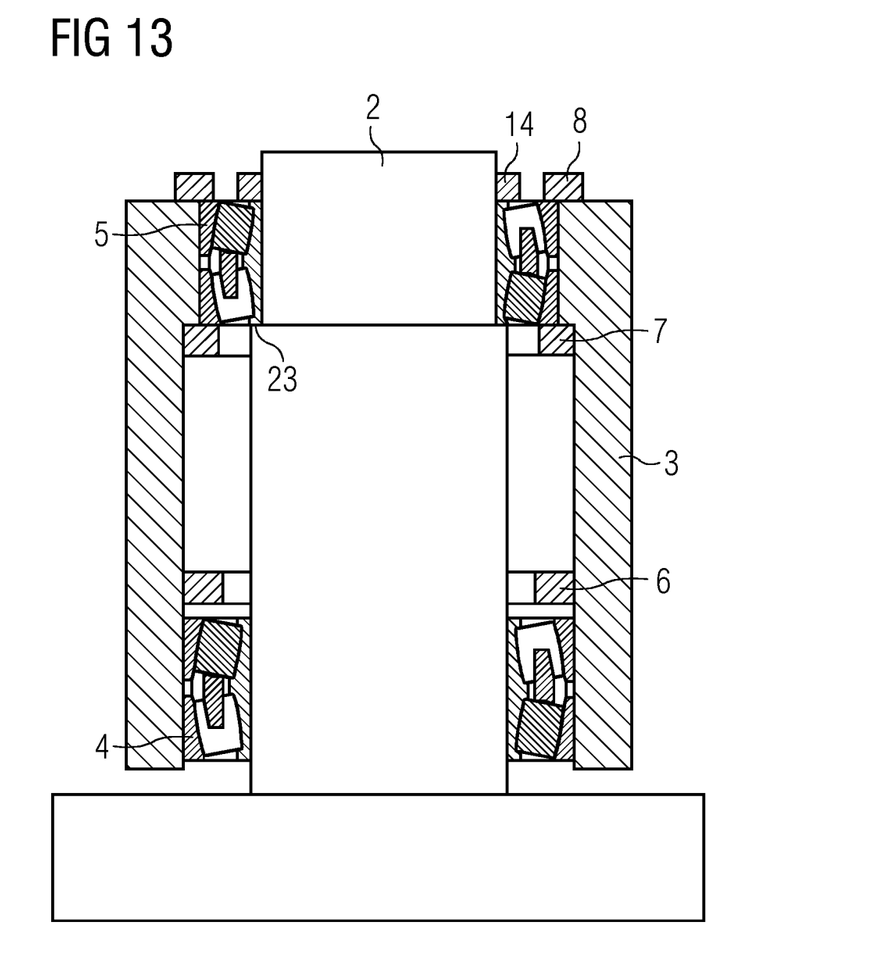
FIG. 13 shows a schematic cross-sectional view of the generator during the method of manufacturing the same according to an embodiment.

FIG. 13 shows a schematic cross-sectional view of the drive train 1 during the method of manufacturing the same according to an embodiment. A third cover 8 is mounted to the housing 3 by bolts 12 (FIG. 2) such that the rear bearing outer ring 51 is secured, i.e. compressed, by the second and third covers 7, 8, wherein the third cover 8 is configured to seal a rear side of the rear bearing 5.

A ring 14 is mounted to the shaft 2 such that the ring 14 secures and/or contacts the rear bearing inner ring 52. Thereby, the rear bearing inner ring 52 is axially secured between the ring 14 and the shoulder 23 of the shaft 2. As a result, the ring 14 and the shoulder 23 provide a form-fit fixation of the rear bearing inner ring 52, while the rear bearing inner ring 52 is additionally held in place by a force-fit fixation which is achieve by cooling the rear bearing 5 after the step of temporarily heating the same in FIG. 6. In alternative embodiments, the rear bearing 5 can be held in place either by the form-fit combination of the ring 14 and the shoulder 23, or by the force-fit fixation as achieve by cooling the rear bearing 5.

As shown in FIG. 3, the first cover 6 is connected to the housing 3 such that a first axial clearance remains between the first cover 6 and the front bearing 4, by mounting an auxiliary support 9 to the housing 3 which connects the first cover 6 to the housing 3. The auxiliary support 9 is mounted through the access window 15 (FIG. 1), which is provided in the housing 3 between the first and second covers 6, 7. The auxiliary support 9 is mounted to the housing 3 and the first cover 6 by bolts 13. The auxiliary support 9 does not have the shape of a ring. The auxiliary support 9 has the shape of a plate, or the shape of a ring segment. Anyway, the access window 15 is dimensioned such that the auxiliary support 9 can be passed through.

In a modified embodiment, the fourth cover 16 is not necessarily to be mounted before step b), but it can be mounted at any time as long as there is an access to that part of the housing 3 where the fourth cover 16 is to be mounted.

In the specification, the terms "front" and "rear" are not necessarily related to the drive end, where the flange 22 is usually arranged, and the non-drive end of the drive train 1, where the end of the hollow shaft portion 21 is located. While the rear bearing 5 is a fixed bearing and the front bearing 4 is a floating bearing in the depicted embodiments, the fixed bearing and floating bearing can be interchanged in an alternative embodiment. That is, while the depicted embodiments have the flange 22 at a front end of the shaft 2, the flange 22 can be provided at the rear end of the shaft 2 in an alternative embodiment. The term "front" refers to the left-hand side in the figures, and the term "rear" refers to the right-hand side in the figures.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of assembling a drive train for an electric machine, the drive train comprising a shaft having a front end and a rear end and is supported in a housing via a front bearing and a rear bearing, the front bearing comprising a front bearing outer ring and a front bearing inner ring, and the rear bearing comprising a rear bearing outer ring and a rear bearing inner ring, the method comprising the following steps:
   a) providing the shaft;
   b) mounting the front bearing to the shaft by temporarily heating the front bearing and shifting the same to a front position at the shaft;
   c) arranging a first cover and a second cover at the shaft from a rear end of the shaft, wherein the first cover is configured to seal a rear side of the front bearing and the second cover is configured to seal a front side of the rear bearing, wherein the first cover is configured to be mounted to the housing by an auxiliary support, wherein the auxiliary support abuts a portion of the housing and a rear axial end of the first cover, and wherein the auxiliary support is configured to be mounted to the housing and the first cover;
   d) mounting the rear bearing to the shaft by temporarily heating the rear bearing and shifting the same from the rear end of the shaft to a rear position at the shaft;
   e) mounting the second cover to the rear bearing outer ring;
   f) mounting the housing to the shaft by temporarily heating the housing and relatively moving the same over the shaft from the rear end of the shaft till a housing abutment abuts to the second cover;
   g) mounting the second cover to the housing;
   h) dismounting the second cover from the rear bearing outer ring; and
   i) mounting a third cover to the housing such that the rear bearing outer ring is secured by the second and third covers, wherein the third cover is configured to seal a rear side of the rear bearing.

2. The method according to claim 1, further comprising:
connecting the first cover to the housing such that a first axial clearance remains between the first cover and the front bearing, by mounting the auxiliary support to the housing which connects the first cover to the housing.

3. The method according to claim 2, wherein:
the auxiliary support is mounted through at least one access window which is provided in the housing between the first and second covers.

4. The method according to claim 1, comprising at least one of the following features:
in step e), the second cover is mounted to the rear bearing outer ring by bolts, and in step h), the second cover is dismounted from the rear bearing outer ring by releasing the bolts;
in step g), the second cover is mounted to the housing by bolts;
in step i), the third cover is mounted to the housing by bolts;
the auxiliary support is mounted to the housing and the first cover by bolts.

5. The method according to claim 1, further comprising:
after step i), mounting a ring to the shaft such that the ring at least one of secures and contacts the rear bearing inner ring.

6. The method according to claim 1, further comprising:
before step b), mounting a fourth cover to the housing, the fourth cover is configured to seal a front side of the front bearing, and in step b), the front bearing is shifted to the front position at the shaft from a rear end of the shaft such that a second axial clearance remains between the fourth cover and the front bearing.

7. The method according to claim 1, wherein at least one of the front bearing and the rear bearing comprises either non-tapered rolling bodies, or spherical rolling bodies.

8. The method according to claim 1, wherein the housing is a single-piece housing.

9. The method according to claim 1, further comprising: between steps g) and h), a step of temporarily supporting the housing by a jig.

10. The method according to claim 1, wherein a first bolt passes through the auxiliary support and subsequently through the housing to connect the auxiliary support to the housing and wherein a second bolt passes through the auxiliary support and subsequently through the first cover to connect the auxiliary support to the first cover.

11. The method according to claim 1, wherein the auxiliary support abuts both the portion of the housing and the rear axial end of the first cover in a radial plane.

12. A drive train for an electric machine, the drive train comprising:
a shaft having a front end and a rear end and being supported in a housing via a front bearing and a rear bearing, wherein the front bearing comprising a front bearing outer ring and a front bearing inner ring, and the rear bearing comprising a rear bearing outer ring and a rear bearing inner ring;
a first cover mounted to the housing and being configured to seal a rear side of the front bearing, wherein the first cover is mounted to the housing by an auxiliary support, wherein the auxiliary support abuts a portion of the housing and a rear axial end of the first cover, and wherein the auxiliary support is mounted to the housing and the first cover to connect the first cover to the housing;
a second cover mounted to the housing and being configured to seal a front side of the rear bearing; and
a third cover mounted to the housing and being configured to seal a rear side of the rear bearing, wherein the rear bearing outer ring is secured by the second and third covers; wherein
the housing is a single-piece housing; and
the housing comprises at least one access window which is provided between the first and second covers.

13. The drive train according to claim 12, wherein:
the first cover is connected to the housing such that a first axial clearance remains between the first cover and the front bearing.

14. The drive train according to claim 12, comprising at least one of the following features:
the second cover is mounted to the housing by bolts;
the third cover is mounted to the housing by bolts; and
the auxiliary support is mounted to the housing and the first cover by bolts.

15. The drive train according to claim 12, further comprising:
a ring mounted to the shaft such that the ring secures and contacts the rear bearing inner ring.

16. The drive train according to claim 12, further comprising:
a fourth cover mounted to the housing and being configured to seal a front side of the front bearing, wherein a second axial clearance remains between the fourth cover and the front bearing.

17. The drive train according to claim 12, wherein at least one of the front bearing and the rear bearing comprises either non-tapered rolling bodies, or spherical rolling bodies.

18. The drive train according to claim 12, wherein a first bolt passes through the auxiliary support and subsequently through the housing to connect the auxiliary support to the housing and wherein a second bolt passes through the auxiliary support and subsequently through the first cover to connect the auxiliary support to the first cover.

19. The drive train according to claim 12, wherein the auxiliary support abuts both the portion of the housing and the rear axial end of the first cover in a radial plane.

* * * * *